(12) United States Patent
Adams et al.

(10) Patent No.: US 7,240,941 B2
(45) Date of Patent: Jul. 10, 2007

(54) VEHICLE STORAGE ASSEMBLY WITH ADJUSTABLE DOOR

(75) Inventors: Robert J Adams, Ypsilanti, MI (US);
Michael W Cass, Lenox, MI (US);
Todd L DePue, Brighton, MI (US);
Kenneth William Paul Shaner,
Howell, MI (US)

(73) Assignee: Lear Corporation, Southfield, MI (US)

( * ) Notice: Subject to any disclaimer, the term of this patent is extended or adjusted under 35 U.S.C. 154(b) by 144 days.

(21) Appl. No.: 10/904,387

(22) Filed: Nov. 8, 2004

(65) Prior Publication Data

US 2006/0097534 A1  May 11, 2006

(51) Int. Cl.
*B60R 7/06* (2006.01)

(52) U.S. Cl. .................. 296/37.1; 296/37.8; 296/37.12; 49/26; 49/386

(58) Field of Classification Search .............. 296/37.1, 296/37.8, 37.12, 146.4, 76; 49/386, 21, 26, 49/28; 16/82
See application file for complete search history.

(56) References Cited

U.S. PATENT DOCUMENTS

| | | | |
|---|---|---|---|
| 2,667,237 A | 1/1954 | Rabinow | |
| 5,284,330 A * | 2/1994 | Carlson et al. | 267/140.14 |
| 5,460,585 A | 10/1995 | Gentry et al. | |
| 6,095,922 A * | 8/2000 | Friedrichsen et al. | 464/24 |
| 6,189,662 B1 * | 2/2001 | Bivens et al. | 188/288 |
| 6,213,445 B1 | 4/2001 | Sato et al. | |
| 6,349,449 B1 * | 2/2002 | Kuehl | 16/342 |
| 6,378,671 B1 * | 4/2002 | Carlson | 188/267.2 |
| 6,440,322 B1 | 8/2002 | Kim et al. | |
| 6,471,018 B1 * | 10/2002 | Gordaninejad et al. | 188/267.1 |
| 6,782,242 B1 * | 8/2004 | Koleda et al. | 455/90.3 |
| 6,857,675 B2 * | 2/2005 | Hayashi et al. | 296/37.12 |
| 6,968,929 B2 * | 11/2005 | Doornbos et al. | 188/290 |
| 6,968,930 B2 * | 11/2005 | Shibao | 188/322.17 |
| 7,040,467 B2 * | 5/2006 | Carlson | 188/267 |
| 7,175,227 B2 * | 2/2007 | Menard | 296/146.4 |
| 2003/0226728 A1 | 12/2003 | Shimada et al. | |

* cited by examiner

*Primary Examiner*—D. Glenn Dayoan
*Assistant Examiner*—Greg Blankenship
(74) *Attorney, Agent, or Firm*—Wood, Herron & Evans, LLP

(57) ABSTRACT

A vehicle storage assembly includes a storage compartment having an opening to permit access to the compartment. A door adjacent the opening is moveable between a closed position that covers the opening and an open position that permits access to the compartment through the opening. The storage assembly further includes a controllable damper coupled to the door and actuable between high and low damping states, such that the door is maintained in one of the closed position, the open position, or any position therebetween when the controllable damper is in the high damping state. To move the door to a new position, the controllable damper is actuated from the high damping state to the low damping state whereby the door can then be freely moved to the desired position. The controllable damper may then be actuated from the low damping state to the high damping state to retain the door in the selected position.

14 Claims, 2 Drawing Sheets

VEHICLE STORAGE ASSEMBLY WITH ADJUSTABLE DOOR

CROSS-REFERENCE

The present invention is related to U.S. patent application Ser. No. 10/904,386 and U.S. patent application Ser. No. 10/904,385, filed on even date herewith.

FIELD OF THE INVENTION

The present invention relates generally vehicle interiors, and more particularly to a storage assembly having a selectively positionable door.

BACKGROUND OF THE INVENTION

Vehicle interiors include various accessories to improve the comfort and convenience of the vehicle. For example, vehicle interiors are often provided with various compartments adapted to store items such as maps, coins, compact discs and tapes, and other personal items of the vehicle occupants. A storage compartment in a vehicle interior may be provided on a center console or mounted to a dashboard as a glove box, for example. An access door or lid is typically provided to cover an opening to the storage compartment so that items may be secured and hidden from view. The door of the storage compartment is typically maintained in a closed position by a latch associated with the storage assembly, and a spring is often used to bias the door toward an open position when the latch is released. Vehicle storage compartments may further include a damper to control the motion of the door between the closed and open positions. Because the damper and latch are usually provided as separate mechanisms, increased costs and manufacturing time are required to assemble conventional vehicle storage assemblies. Moreover, the dampers are not typically tunable to permit optimization of the motion and speed of door movement between the closed an open positions.

A need therefore exists for a vehicle storage assembly that addresses these and other drawbacks of the prior art.

SUMMARY OF THE INVENTION

The present invention provides an automotive storage assembly having a door that is selectively positionable to and between a closed position, wherein the door covers an opening to a storage compartment, and an open position, wherein the door extends away from the opening to permit access to the compartment. The storage assembly includes a controllable damper coupled to the door. The controllable damper is actuable to and between high and low damping states to control movement of the door and to maintain the door in a desired position. In the low damping state, the door can be freely moved to a desired position. The damper is actuated to the high damping state to retain the door in the selected position.

In one embodiment, the controllable damper is a magneto-rheological damper having a fluid that is responsive to an imposed magnetic field to vary the apparent viscosity of the damper. The storage assembly further includes a permanent magnet associated with the magneto-rheological damper and configured to provide a magnetic field that maintains the damper in the high damping state without requiring power to be supplied to the damper.

In another embodiment, a wire coil associated with the magneto-rheological damper can be energized by an electric current to create a second magnetic field that substantially negates the magnetic field produced by the permanent magnet. When the magnetic fields cancel each other, the apparent viscosity of the magneto-rheological damper decreases and corresponds to the low damping state. In this manner, the wire coil can be used to selectively actuate the magneto-rheological damper between the high and low damping states.

In yet another embodiment, the storage assembly further includes a switch and a controller communicating with the controllable damper to facilitate selective actuation of the controllable damper to and between the high and low damping states.

The features and objectives of the present invention will become more readily apparent from the following Detailed Description taken in conjunction with the accompanying drawings.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION

Figure 1:
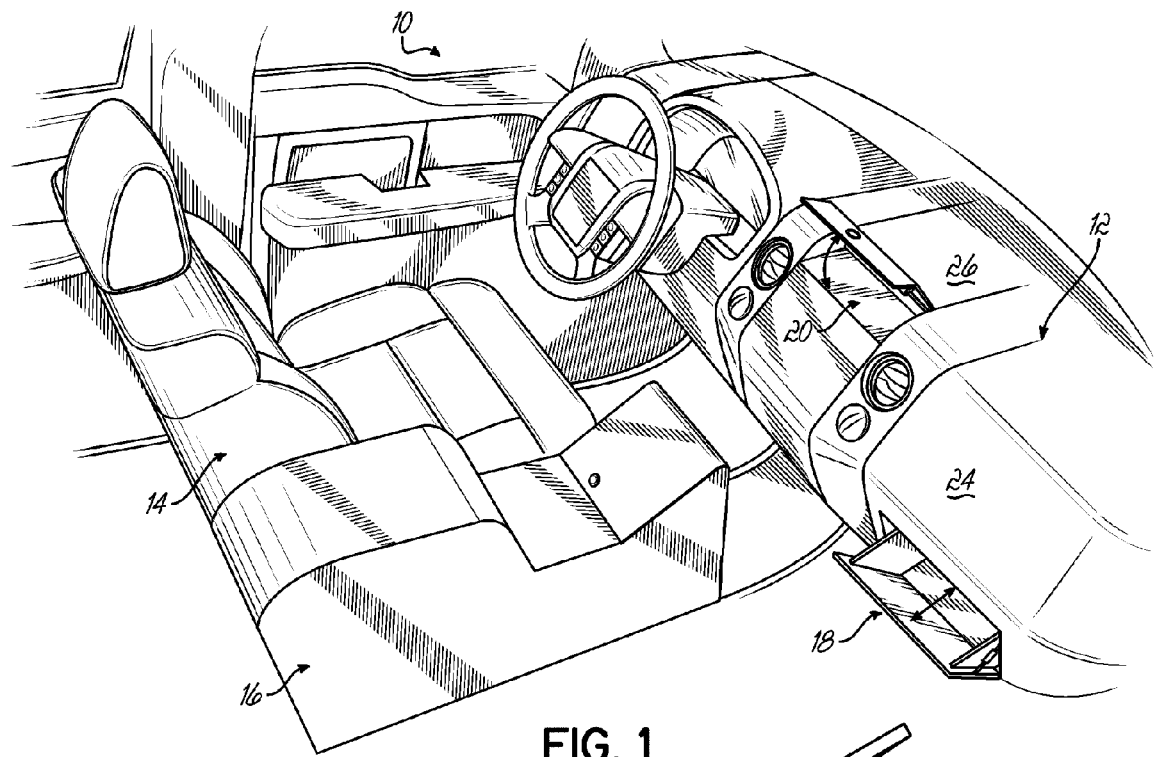
FIG. 1 is a perspective view of an automotive interior, including exemplary storage assemblies according to the present invention.

FIG. 1 depicts a conventional automotive interior 10 including a dashboard 12, articulating front seats 14 (only one shown), and a center console 16 disposed between the front seats 14. The vehicle interior 10 further includes various exemplary storage assemblies 18, 20 provided in the vehicle interior for the comfort and convenience of vehicle occupants.

Figure 2:
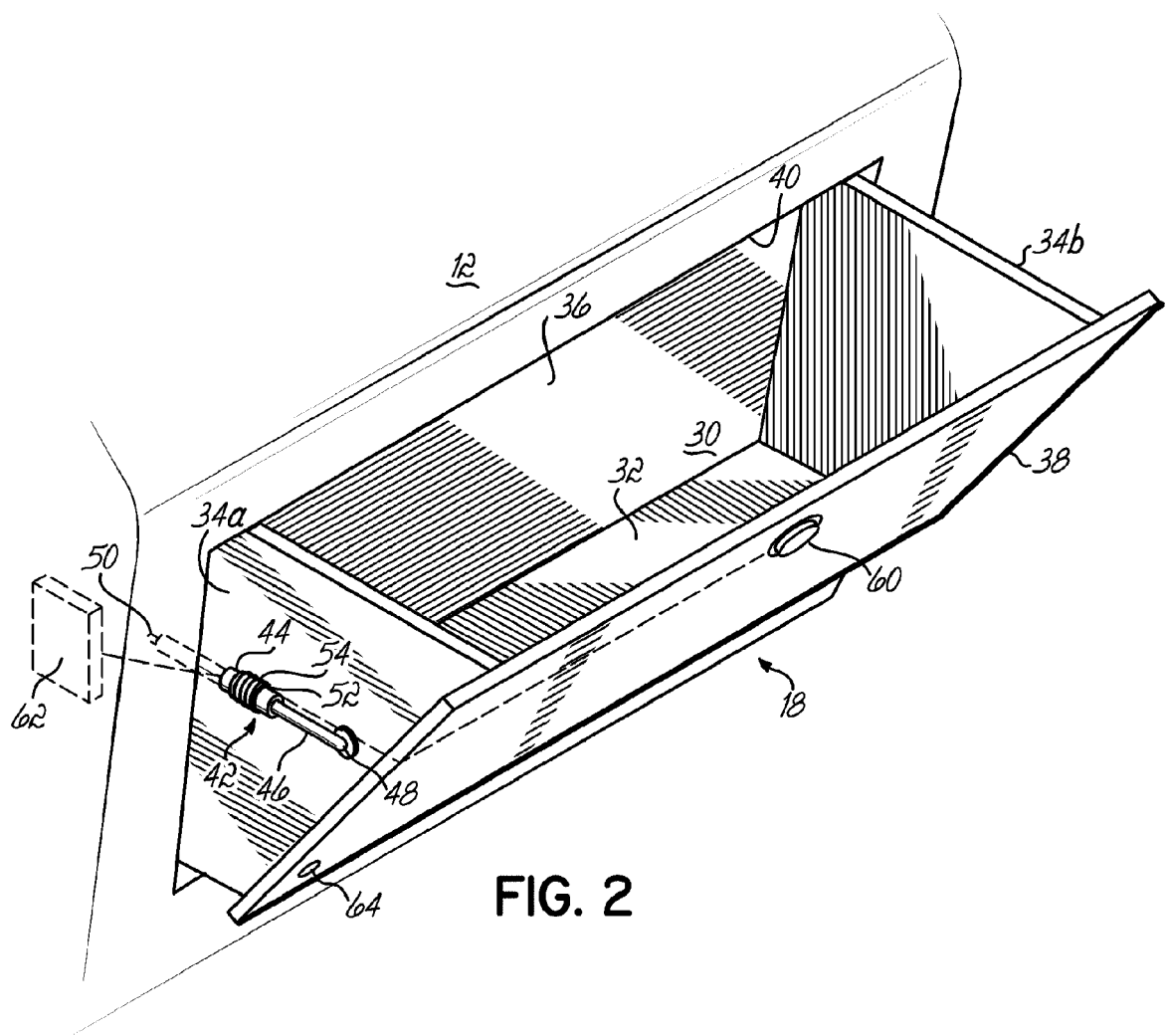
FIG. 2 is a perspective view of one exemplary storage assembly of the present invention, in the form of a glove box.

FIG. 2 depicts one embodiment of a storage assembly 18 according to the present invention, in the form of a glove box. The glove box is provided in a lower portion 24 of the dashboard 12, on a passenger side of the vehicle, as known in the art. In this embodiment, a storage compartment 30 is defined by a bottom wall 32, opposing sidewalls 34a, 34b, a rear wall 36 and a door 38 of the glove box. The door 38 is moveable between a closed position and an open position relative to an opening 40 formed in the dashboard 12. In the closed position, the door 38 is substantially flush with the dashboard 12 and substantially covers the opening 40 to conceal the contents of the compartment 30 from view. The door 38 may be moved to the open position, away from the opening 40, to permit access to the compartment 30, as known in the art.

The storage compartment, or glove box 18, further includes a controllable damper 42 coupled to the door 38 to facilitate moving and maintaining the door 38 between the open and closed positions. In the embodiment shown, the controllable damper 42 is secured to one of the sidewalls 34a. It will be recognized, however, that the damper 42 may alternatively be secured directly to the door 38, or to other structure of the glove box. In the embodiment shown, the controllable damper 38 is a linear damper, including a piston housing 44 and a piston rod 46 slidably and extensibly coupled to the housing 44. One end 48 of the damper is secured to the door 38 and the other end 50 of the damper is secured to the dashboard structure. As the door 38 is moved between the closed and open positions, the piston rod 46 is caused to extend and retract relative to the piston housing 44.

The controllable damper 42 is selectively actuable to and between high and low damping states. In the high damping state, the controllable damper 42 resists movement of the door 38 so that the door can be maintained in the opened position, the closed position, or any position therebetween. To move the door 38 between the closed and open positions, the controllable damper 42 is actuated to the low damping state and the door 38 moved to a desired position. Once the door 38 is at the desired position, the controllable damper 42 is actuated back to the high damping state to retain the door 38 in the selected position. The controllable damper 42 may alternatively be actuated to an intermediate damping state, between the high and low damping states, to control the resistance to movement of the door 38 between selected positions. In this manner, the "feel" of the movement of the door 38 may be tuned to provide aesthetically pleasing performance, as may be desired.

In one embodiment, the controllable damper 42 is a magneto-rheological damper having a fluid that is responsive to an imposed magnetic field to vary the apparent viscosity of the damper. The storage assembly 18 may further include a permanent magnet 52 associated with the controllable damper 42 and configured to provide a magnetic field that increases the apparent viscosity of the fluid to a point corresponding to the high damping state and which is sufficient to retain the door 38 in the selected position. Because the magnetic field is provided by a permanent magnet 52, no power is required to maintain the controllable damper 42 in the high damping state.

The storage assembly 18 further includes a wire coil 54 proximate the permanent magnet 52 and configured to create a second magnetic field that substantially negates the magnetic field produced by the permanent magnet 52 when current is supplied to the wire coil 54. Accordingly, the magneto-rheological damper 42 may be actuated from the high damping state to the low damping state by energizing and de-energizing the wire coil 54. Moreover, since the controllable damper 42 is able to retain the door 38 in a selected position during the high damping state, a storage assembly according to the present invention does not require a separate latch mechanism to keep the door in the closed position.

In another embodiment, the storage assembly 18 further includes a switch 60 communicating with the controllable damper 42 to facilitate actuating the controllable damper between the high and low damping states. The switch 60 may be activated, for example, when a user depresses the switch 60 to actuate the damper 42 between the high and low damping states. When the switch 60 is released, the damper 42 may be actuated from the low damping state back to the high damping state. Alternatively, the switch 60 may be configured to actuate the damper 42 from the high damping state to the low damping state when first manipulated by a user. Upon further manipulation by a user, the switch 60 actuates the damper 42 from the low damping state back to the high damping state. It will be recognized that other schemes for actuating the damper 42 between the high and low damping states using the switch 60 may be achieved.

In another embodiment, the storage assembly 18 further includes a controller 62 associated with the damper 42 and configured to send signals to the damper 42 to thereby actuate the damper between the high and low damping states. In one embodiment, the controller 62 is configured to adjust the damping state of the controllable damper 42 upon receiving a signal from the switch 60. For example, if the controllable damper 42 is a magneto-rheological damper, activation of the switch 60 may signal the controller 62 to regulate current supplied to the wire coil 54 to thereby actuate the controllable damper 42 between high and low damping states, as described above.

In another embodiment, the glove box 18 further includes a sensor 64 mounted to the door 38 and communicating with the controller 62 to limit the motion of the door 38 to avoid impact with a vehicle occupant or an object, such as a front seat 14 which is positioned at its furthest extent forward in the vehicle interior. In use, the sensor 64 sends a signal to the controller 62 that is related to the distance between the door 38 and the object in front of the door 38. When the door 38 is a predetermined distance from the object, the controller 62 actuates the damper 42 to the high damping state to prevent further movement of the door 38 toward the object, thereby preventing impact with the object.

Figure 3:
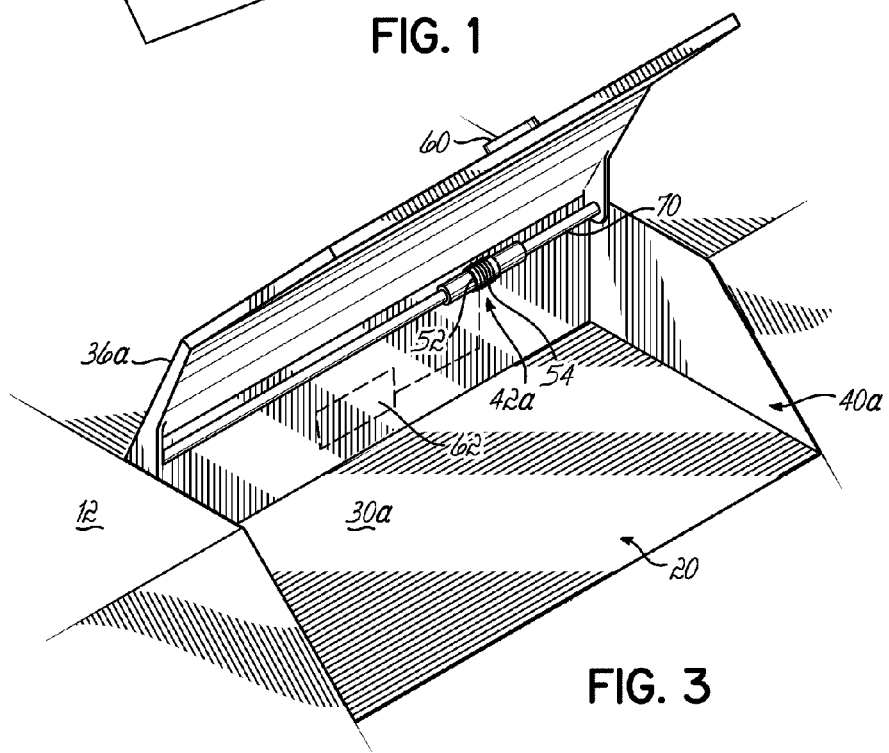
FIG. 3 is a perspective view of a second exemplary storage assembly, in the form of a dash-mounted compartment.

FIG. 3 depicts another embodiment of a storage assembly 20 according to the present invention, in the form of a storage compartment 30a located on upper portion 26 of the dashboard 12. The storage assembly 20 of FIG. 3 is similar to the storage assembly 18 described above with respect to FIG. 2, and like components have been similarly numbered. In this embodiment, the door 36a is mounted on a shaft 70 for pivotal movement relative to the opening 40a of the storage compartment 30a. The controllable damper 42a is a rotary damper that is coupled to the door 36a to thereby control movement of the door to and between the closed and open positions. The rotary damper 42a is actuable between high and low damping states wherein the damper maintains the door 36a in the closed position, the open position, or any position therebetween when actuated to the high damping state. In the low damping state, the door 36a may be selectively positioned in the closed position, the open position, or any position therebetween, as discussed above with respect to FIG. 2.

While various embodiments of storage assemblies according to the present invention have been depicted and described herein as a glove box 18 and a dash mounted storage assembly 20, it will be recognized that various other storage assemblies according to the present invention may be provided on the center console or other parts of the vehicle interior.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of Applicant's general inventive concept.

What is claimed is:

1. A vehicle storage assembly for use within an interior of a vehicle, comprising:

a storage compartment adapted for use within the interior of the vehicle and having an opening to permit access to said compartment;

a door proximate said opening, said door movable between a closed position that covers said opening, and an open position away from said opening to permit access to said compartment through said opening;

a controllable damper coupled to said door and adjustable between high and low damping states, independent of the position of said door, to facilitate moving and maintaining said door between said open and closed positions;

a controller communicating with said controllable damper, said controller operable to actuate said controllable damper between said high and low damping states; and a sensor communicating with said controller and adapted to sense the presence of an object in a path of said door between said closed position and said open position and to generate a signal when the presence of an object is sensed.

2. The storage assembly of claim 1, further comprising a switch associated with said controllable damper and operable to facilitate selective actuation of said controllable damper between said high and low damping states.

3. The storage assembly of claim 1, wherein said controllable damper is a magneto-rheological damper.

4. The storage assembly of claim 3, further comprising a permanent magnet associated with said controllable damper, said permanent magnet adapted to maintain said magneto-rheological damper in said high damping state without requiring power to be supplied to said damper.

5. The storage assembly of claim 4, further comprising:

a wire coil associated with said permanent magnet and configured to substantially negate a magnetic field produced by said permanent magnet when current is supplied to said wire coil to actuate said magneto-rheological damper from said high damping state to said low damping state.

6. The storage assembly of claim 1, wherein said controller adjusts said controllable damper to limit movement of said door between said closed position and said open position in response to said signal from said sensor.

7. The storage assembly of claim 1, wherein said signal is related to a distance between said door and the object.

8. The storage assembly of claim 7, wherein said controller adjusts said controllable damper to said high damping state when said door is a predetermined distance from the object, in response to said signal from said sensor.

9. A method of adjusting the position of a door of a storage assembly in a vehicle between a closed position that covers an opening to a storage compartment within the interior of the vehicle, and an open position wherein the door extends away from the opening to permit access to the compartment, the storage assembly including a controllable damper coupled to the door, the method comprising:

adjusting the controllable damper from a high damping state to a low damping state;

selectively adjusting the position of the door relative to the opening to the compartment;

adjusting the controllable damper from the low damping state to the high damping state such that the door is maintained in the adjusted positioned by the controllable damper;

sensing the presence of an object in a path of the door between the closed position and the open position; and adjusting the controllable damper in response to the sensed object to limit movement of the door between the closed position and the open position.

10. The method of claim 9, wherein the controllable damper is a magneto-rheological damper.

11. The method of claim 10, wherein the storage assembly further includes a permanent magnet associated with the magneto-rheological damper, and wherein the magneto-rheological damper is actuated to the high damping state using the permanent magnet.

12. The method of claim 11, wherein the storage assembly includes a wire coil associated with the magneto-rheological damper, the method further comprising:

supplying an electric current through the wire coil to substantially negate a magnetic field produced by the permanent magnet and thereby actuate the magneto-rheological damper from the high damping state to the low damping state.

13. The method of claim 9, wherein adjusting the controllable damper in response to the sensed object comprises actuating the controllable damper from a low damping state to a high damping state.

14. The method of claim 9, further comprising:

selectively adjusting the controllable damper to a damping state intermediate the high damping state and the low damping state such that the resistance of the door to movement is adjusted.

* * * * *

UNITED STATES PATENT AND TRADEMARK OFFICE
CERTIFICATE OF CORRECTION

PATENT NO. : 7,240,941 B2  Page 1 of 1
APPLICATION NO. : 10/904387
DATED : July 10, 2007
INVENTOR(S) : Robert J. Adams et al.

It is certified that error appears in the above-identified patent and that said Letters Patent is hereby corrected as shown below:

On The Title Page Item (56),
Column 2, line 7,
Cover page, reads "...6,857,675...Hayashi et al." and should read
-- ...6,857,675...Kurachi et al. --.

Signed and Sealed this

Twenty-fifth Day of December, 2007

JON W. DUDAS
*Director of the United States Patent and Trademark Office*